United States Patent
Bin et al.

(10) Patent No.: US 7,853,783 B2
(45) Date of Patent: Dec. 14, 2010

(54) METHOD AND APPARATUS FOR SECURE COMMUNICATION BETWEEN USER EQUIPMENT AND PRIVATE NETWORK

(75) Inventors: FanXiang Bin, Shanghai (CN); QingShan Zhang, Shanghai (CN); YingLan Jiang, Shanghai (CN); RenXiang Yan, Shanghai (CN); HaiBo Wen, Shanghai (CN); ZheMin Ding, Shanghai (CN)

(73) Assignee: Alcatel Lucent, Paris (FR)

( * ) Notice: Subject to any disclaimer, the term of this patent is extended or adjusted under 35 U.S.C. 154(b) by 1020 days.

(21) Appl. No.: 11/616,937

(22) Filed: Dec. 28, 2006

(65) Prior Publication Data
US 2007/0157309 A1    Jul. 5, 2007

(30) Foreign Application Priority Data
Dec. 30, 2005    (CN) .................. 2005 1 0112411

(51) Int. Cl.
*H04L 29/06* (2006.01)
(52) U.S. Cl. ..................................... 713/153
(58) Field of Classification Search .................. 713/153
See application file for complete search history.

(56) References Cited

U.S. PATENT DOCUMENTS 6,327,660 B1 * 12/2001 Patel ........................... 713/193

2003/0018908 A1    1/2003 Mercer et al.
2003/0039361 A1    2/2003 Hawkes et al.
2003/0229779 A1 * 12/2003 Morais et al. ............... 713/153

FOREIGN PATENT DOCUMENTS

EP        1372315 A2    12/2003

* cited by examiner

*Primary Examiner*—Kambiz Zand
*Assistant Examiner*—Teshome Hailu
(74) *Attorney, Agent, or Firm*—Carmen Patti Law Group, LLC

(57) ABSTRACT

It is an object of the present invention to provide a new technical solution of supporting special secure communication between user equipment which is located in an external network and an private network the user equipment belongs to. Specifically, transmitted data is encrypted/decrypted and authenticated by using pre-stored root keys corresponding to specific private networks and the agreed encryption/decryption and authentication algorithm at the user equipment and an access device. The manner of generating the encryption/decryption keys and authentication key is simplified, and the complexity of the access device at the private network end is reduced on the premise of not degrading the security grade. The technical solution of the present invention is highly flexible and extensible and can achieve better user experience.

25 Claims, 6 Drawing Sheets

METHOD AND APPARATUS FOR SECURE COMMUNICATION BETWEEN USER EQUIPMENT AND PRIVATE NETWORK

FIELD OF THE INVENTION

The present invention relates to secure communication technology in communication networks and more particularly, to a method and apparatus for supporting secure communication between a user equipment which is located in an external network and a private network which the user equipment belongs to in a communication network (especially an IP-based network) environment.

BACKGROUND OF THE INVENTION

In future Internet Protocol Version 6 (IPv6) network environment, huge IP address space allows any electronic device (e.g. computer, mobile device, home appliance) to have its independent IP address, and each electronic device within an enterprise, company or home has its own IP address, thereby constituting a private network. Through parsing these IP addresses or domain names, a member of the private network can communicate with the private network via the Internet from any external user equipment and thus can control or monitor any electronic device on the private network and transfer information.

However, the information of a private network is private and sensitive, whereas the Internet is open. Members of the private network hate to see other person who does not belong to the private network accesses the private network via the Internet, acquires special information of the private network or even controls the electronic devices on the private network.

Also, members of the private network do not want to see that when they normally access the private network from an external network, related data is stolen or tampered maliciously as being transferred on the Internet. Therefore, there is a dire need for a scheme that is able to protect the private network from malicious attacks and to ensure members of the private network to securely access the private network via the Internet from an external network.

In the prior art, virtual private networks (VPN) can assume the task of transmitting private communication on public networks. Virtual private networks are classified as encrypted VPNs and non-encrypted VPNs. The latter's security relies on the trust on Internet service providers and the security and integrity of routing functionality. The encrypted VPNs usually use encrypted tunnels to connect two or more networks needing secure communication together, so that their communication transmitted on public networks is concealed from the outside. A good example of VPNs of such kind is Internet Protocol Security Virtual Private Network (IPsec VPN).

IPsec VPN technology can encrypt data and allow communication traffics to pass through the Internet securely. However, this scheme has the following problems:

1) Due to the uncertainty of the IP address on the IPsec client end, it is impossible to define a unique IP address-based pre-shared key when using an unknown client end's IP address to connect to the gateway;

2) A large amount of complex configuration work is involved on the access server end, and changes in related configurations might alter settings on the client end, thereby resulting in poor extensibility;

3) It is difficult and unnecessary for ordinary users to master a complex and professional parameter negotiation procedure which is involved during setting up IPsec tunnels;

4) The existing IPsec VPN scheme treats the IPsec client end as a part of a home network it needs to connect to, and complex attributes of the original home network need to be configured for remote users, which complexes the implementation of the scheme a lot and increases the cost.

SUMMARY OF THE INVENTION

To overcome the above deficiencies in the prior art, it is an object of the present invention to provide a new technical solution of supporting special secure communication between user equipment, which is located in an external network, and the private network said user equipment belongs to. Specifically, data for transmitting is encrypted/decrypted and authenticated by using pre-stored root keys corresponding to specific private networks and an agreed encryption/decryption and authentication algorithm at the user equipment and an access device, so as to achieve a simple secure communication scheme between the user equipment and the belonging private network without changing the private network.

According to a first aspect of the present invention, provided is a method for implementing secure communication with a private network in user equipment of a communication network, comprising the steps of: generating a security parameters index (SPI) value for indicating a group of parameters and the algorithm for data encryption/decryption; performing an operation on said SPI and a destination address by using a pre-stored first root key, to generate an encryption key; encrypting data to be sent by using said encryption key to generate encrypted data; and encapsulating said encrypted data and said SPI value into a data packet which is then transmitted via the network.

According to a second aspect of the present invention, provided is user equipment for implementing secure communication with a private network in a communication network, comprising: generating means for generating security parameters index (SPI) value for indicating a group of parameters and the algorithm for data encryption/decryption; first operating means for performing an operation on said SPI and a destination address by using a pre-stored first root key, to generate an encryption key; encrypting means for encrypting data to be transmitted by using said encryption key, to generate encrypted data; and encapsulating means for encapsulating said encrypted data and said SPI value into a data packet which is then transmitted via the network.

According to a third aspect of the present invention, provided is a method for supporting secure communication between user equipment and private network in an access device of a communication network, comprising the steps of: receiving a data packet from said user equipment; deciding whether or not said data packet from the user equipment is an encrypted data packet used for secure communication with a private network; if said data packet from the user equipment is an encrypted data packet used for secure communication with said private network according to the present invention, converting said encrypted data packet into an ordinary data packet by using a pre-stored first root key corresponding to said private network, and forwarding the ordinary data packet to said private network.

According to a fourth aspect of the present invention, provided is an access device for supporting secure communication between user equipment and a private network in a communication network, comprising: first receiving means for receiving a data packet from said user equipment; deciding means for deciding whether or not said data packet from the user equipment is an encrypted data packet used for secure communication with a private network; and conversion processing means for, if said data packet from the user equipment is an encrypted data packet used for secure communication with said private network according to the present invention, converting said encrypted data packet into an ordinary data packet by using a pre-stored first root key corresponding to said private network; and first sending means for forwarding the ordinary data packet to said private network.

Compared with the prior art, the technical solution according to the present invention provides a secure access mechanism for members to access a private network from the outside in a communication network environment (especially an IP-based network): except for members of a private network, nobody can access the private network without authorization, the manner of generating the encryption/decryption keys and authentication key is simplified, and the complexity of the access device at the private network end is reduced on the premise of not degrading the security grade. The technical solution of the present invention is highly flexible and extensible and can achieve better user experience.

BRIEF DESCRIPTION ON THE DRAWINGS

Figure 4:
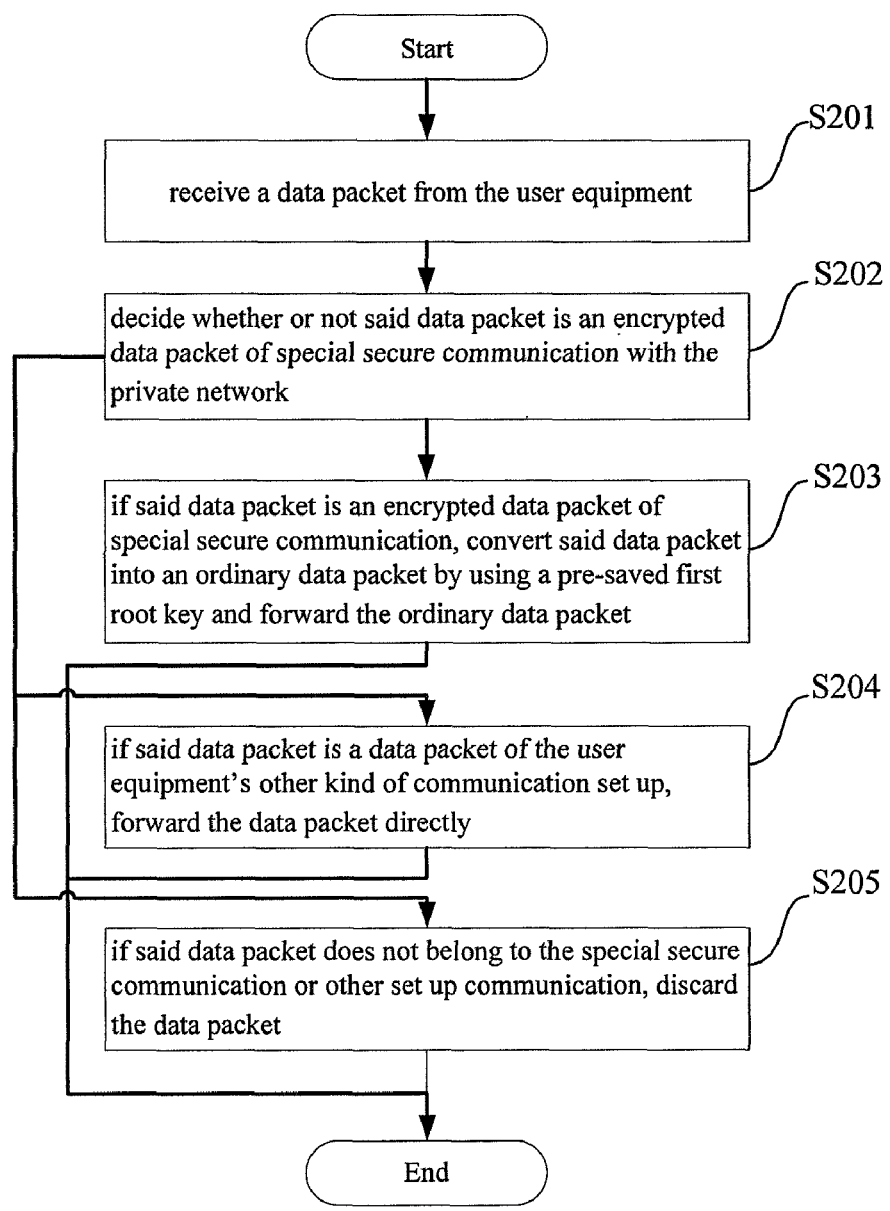
Figure 5:
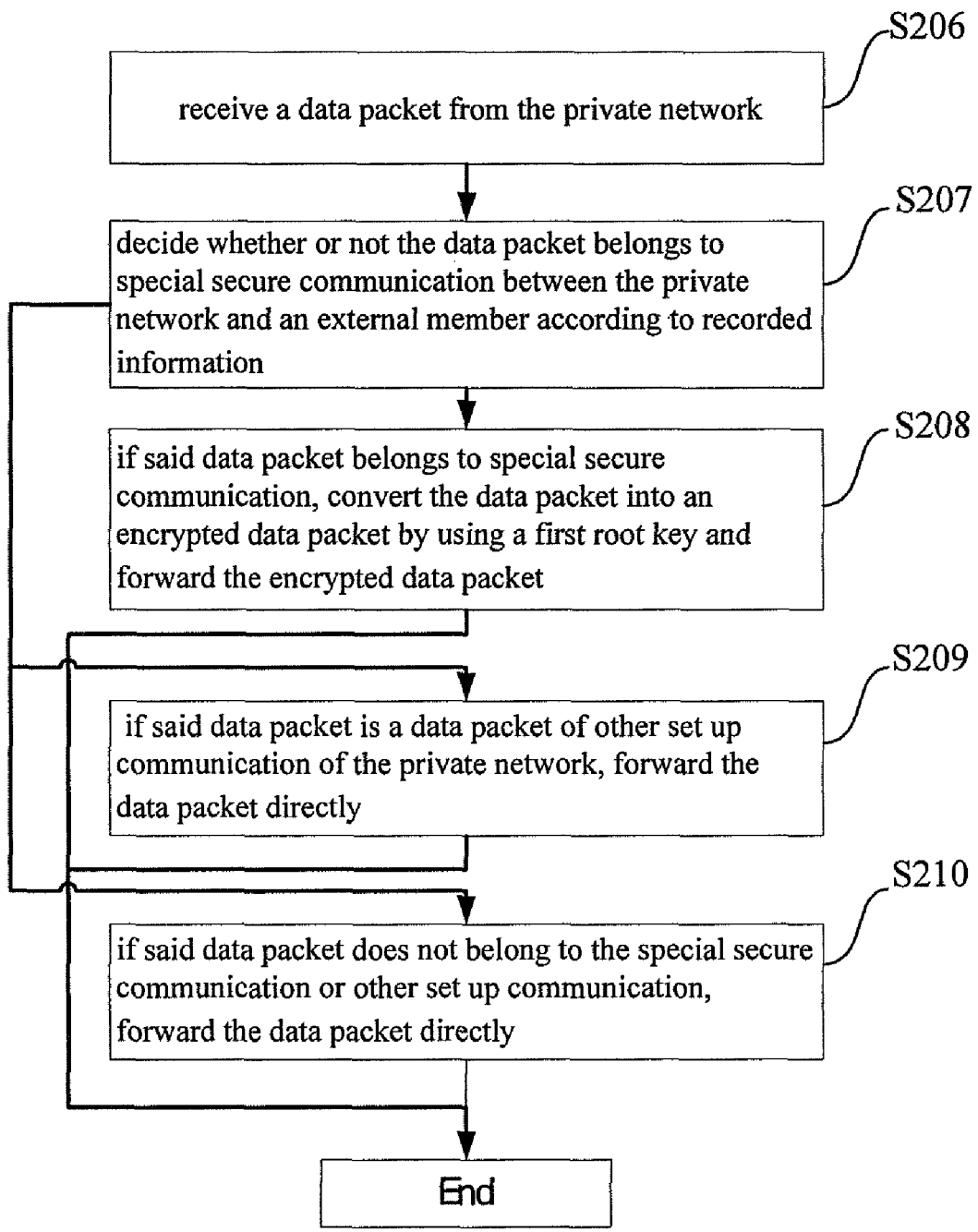
Figure 6:
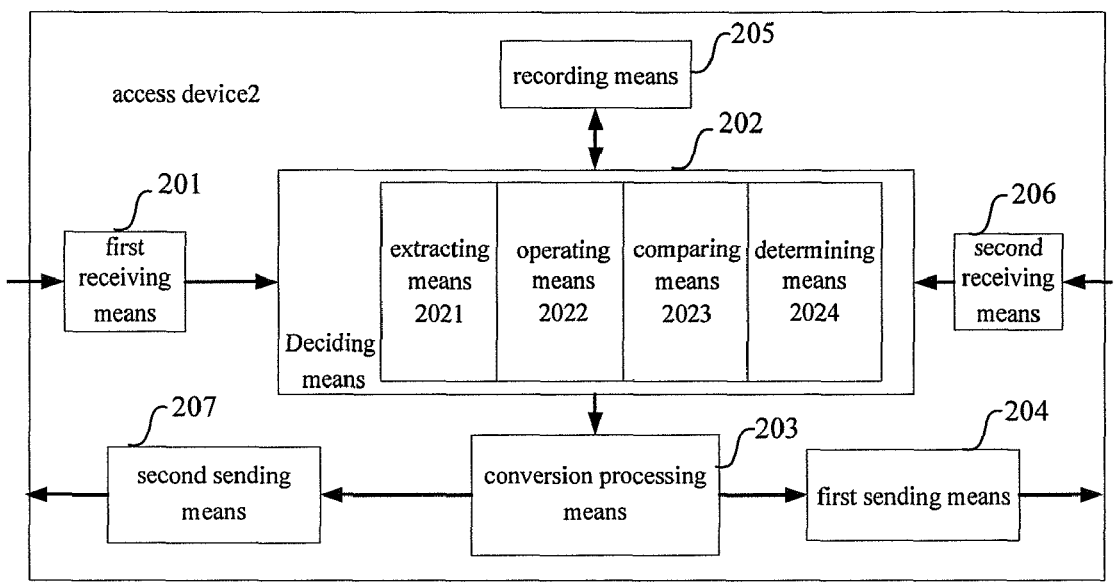

FIGS. 4 and 5 are flowcharts of the method in an access device for supporting special secure communication between user equipment and the private network which the user equipment belongs to in a communication network according to an embodiment of the present invention; and FIG. 6 is a block diagram of an access device for supporting special secure communication between user equipment and a private network which the user equipment belongs to in a communication network according to an embodiment of the present invention.

Wherein, like reference numerals designate the same or similar components throughout the drawings.

DESCRIPTION OF THE PREFERRED EMBODIMENTS

Hereinafter, embodiments of the present invention will be described in detail with reference to the accompanying drawings. However, it should be understood that the present invention is not limited to the embodiments.

In most cases, a member of a private network does not have a fixed location for various reasons as working and learning and might need to communicate with the private network he belongs to at any time. In the solution of the present invention, when an internal member needs to communicate with the private network, for example, control or monitor a certain device on the private network or transmit files, he might use his own notebook, palmtop computer even an ordinary computer in a net bar for such communication. At this point, the members must pay attention to the communication security.

Figure 1:
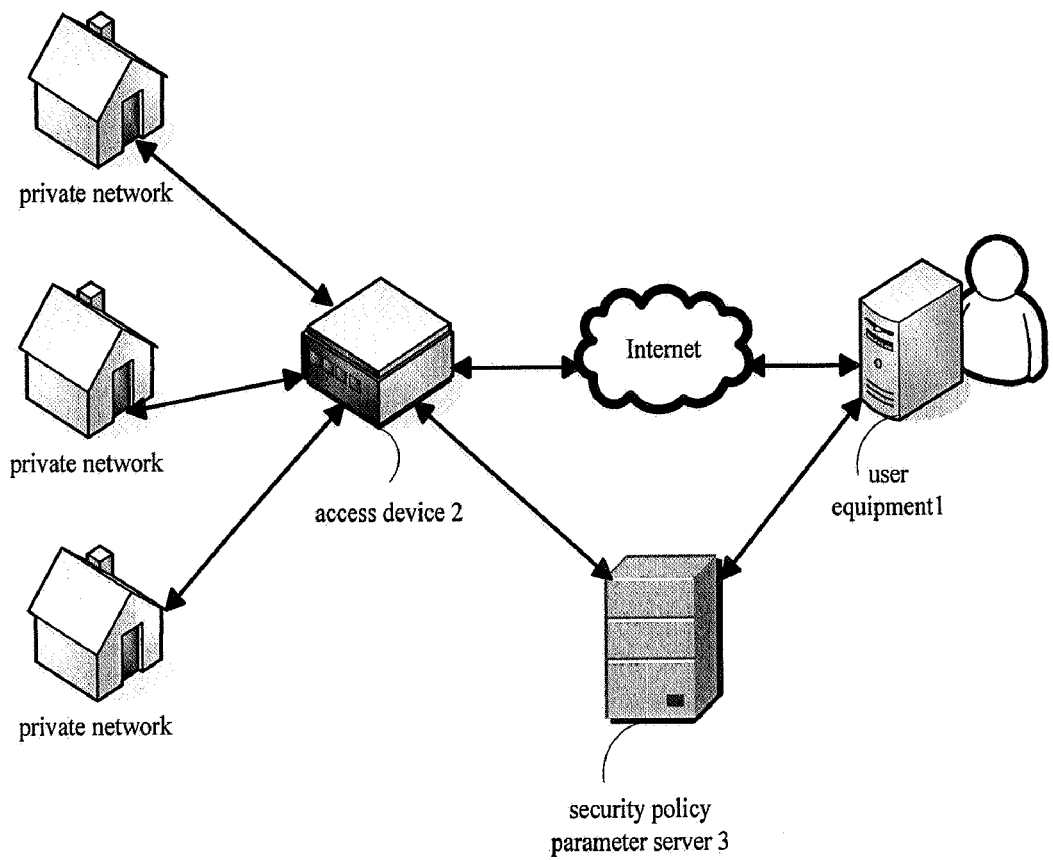
FIG. 1 is a schematic view of a communication network in which user equipment performs secure access to a private network from the outside according to an embodiment of the present invention.

FIG. 1 is a schematic view of a communication network in which user equipment performs secure access to a private network from the outside according to an embodiment of the present invention. Here, said communication network is an IPv6-based network comprising: multiple private networks (e.g. home networks), an access device 1 connected with the private networks, user equipment 2 located in an external network and is a member of a private network, and a security policy parameter server 3 for providing related information updates for the access device and the user equipment. User equipment 1 performs special secure communication according to the present invention with the private network, which it belongs to, via access device 2 through the Internet. Said access device 2 is responsible for the access corresponding to one or more private networks, identifying and processing data packets from the user equipment that is a member of a private network and from the private networks, and ensuring data packets to reach the destination address across the Internet securely. The user equipment may be any computer connected to the Internet.

Hereinafter, the present invention will be described with reference to FIG. 1.

A user as a member of a certain private network is connected to the Internet by using his personal computer (e.g. portable computer) or a public computer (e.g. computer in an net bar) from an external network. In specific implementation, when there is a need to access a network which the user belongs to, he can perform secure communication with the private network he belongs to by starting IPsec client end software contained in his computer or connecting a portable storage device (e.g. USB storage device) containing the IPsec client end software to an online computer. Here, the portable computer or the public computer with the portable device is called user equipment 1.

First, user equipment 1 determines whether the user is the valid owner of the personal computer or the USB storage device by using pre-stored user identity information through interaction with the user (e.g. hints the user to input user name and password). If the user is valid, the flow goes to a subsequent operation, otherwise rejects to do the subsequent operation.

After the user is determined to be valid, user equipment 1 automatically accesses the security policy and parameter distribution server of a carrier to confirm, by means of the digital certificate contained in the personal computer or the USB device, whether or not there are parameters to be updated. If not, user equipment automatically exits from accessing the server. If yes, it automatically downloads data for update which is usually the update of the destination address prefix representing the private network the user belongs to and of security policy parameters (e.g. a first root key, a second root key, encryption/decryption and authentication algorithm, etc.)

Next, user equipment 1 performs operations on the IP address of the current user equipment (host), current date, destination IP address prefix and source IP address in accordance with the locally pre-stored private network address prefix (e.g., a 64-bit prefix is the first 64 bits of an IP address) and the second root key Kspi for generating security parameters index (SPI), to generate a SPI value. Then, the first root key Kroot for generating encryption key and authentication key performs operations on the generated SPI value and a predetermined sequence (e.g. destination address prefix and source address) known to the both parties in accordance with a pre-agreed algorithm, to generate an encryption key Ke and an authentication key Ka. At the same time, detection will be performed automatically upon data packets to be sent to the network card and the decision regarding whether or not to intercept a data packet is subject to whether the destination address prefix (the first 64 bits of an IP address) of the data packet matches the prefix of the belonging private network. If the data packet is confirmed to be sent to the belonging private network, the data to be transmitted thereof will be encrypted according to the agreed security policy and the generated encryption key Ke, to generate the encrypted data; the encrypted data is Hash operated by using the generated authentication key Ka, and the first part of the Hash operation result is then used as an authentication part. The generated SPI value, the encrypted data and the authentication part are encapsulated into an encrypted data packet used for the special secure communication of the present invention, and the processed encrypted data packet is sent to the network card and then to the access device 2 connected with private networks.

Access device 2 (e.g. DSLAM) working for the destination private network checks the incoming data packet (e.g. IP packet in the IPsec format). Access device 2 first checks the destination (IP) address prefix and then finds a root key corresponding to the destination address prefix based on a locally stored mapping table between private network addresses and root keys. Next, access device 2 checks the date value contained in the SPI value, performs operations on the current date, the destination (IP) address prefix and the source (IP) address by using root keys and according to the algorithm agreed with user equipment 1 to obtain a new security parameters index (SPI) value and compares it with the SPI value in the incoming data packet. If the two values are consistent with each other, access device 2 determines that the incoming data packet was from a valid member, otherwise discards the incoming data packet. Subsequently, access device 2 computes an authentication key Ka according to the SPI value, then performs Hash operations on the source (IP) address and the encrypted data by using the authentication key Ka to generate a new authentication part and then compares it with the authentication part contained in the SPI value of the incoming data packet. If the two authentication parts are consistent with each other, access device 2 determines that the data packet has not been tampered and was sent from some valid member, otherwise discards the data packet. Finally, when access device 2 determines that the data packet was not tampered and was sent from a valid member, it computes an encryption key Ke according to the SPI value, decrypts the encrypted data part of the data packet to generate an ordinary data packet and sends the generated ordinary data packet to the corresponding private network.

Preferably, access device 2 should further record related communication information, such as destination IP address, source address, SPI value, Ke and Ka, of the successfully processed data packet, so as to speed up the processing on the subsequent packets and the processing on data sent from a private network to a user equipment as a member located in an external network. Additionally, the access device 2 should also record related information of all communication with an external network that has been initiated by a private network, this can be achieved by using, for example, common firewall technology. In this manner, illegal users are prevented from attacking a private network.

As for a subsequent data packet sent from a private network, the access device makes a decision as to whether or not it belongs to the special secure communication with an external member based on the recorded related information of all previously set up communication. If yes, like the manner at the user equipment, the access device processes data by using the stored root key corresponding to the private network (source IP address prefix) and in the agreed manner to generate an encrypted data packet containing the source IP address, the destination IP address, the SPI value, the encrypted data part and the authentication part, and then sends said encrypted data packet to corresponding user equipment 1. User equipment 1 checks the encrypted data packet from access device 2 and performs related decryption processing to obtain the original data.

Figure 2:
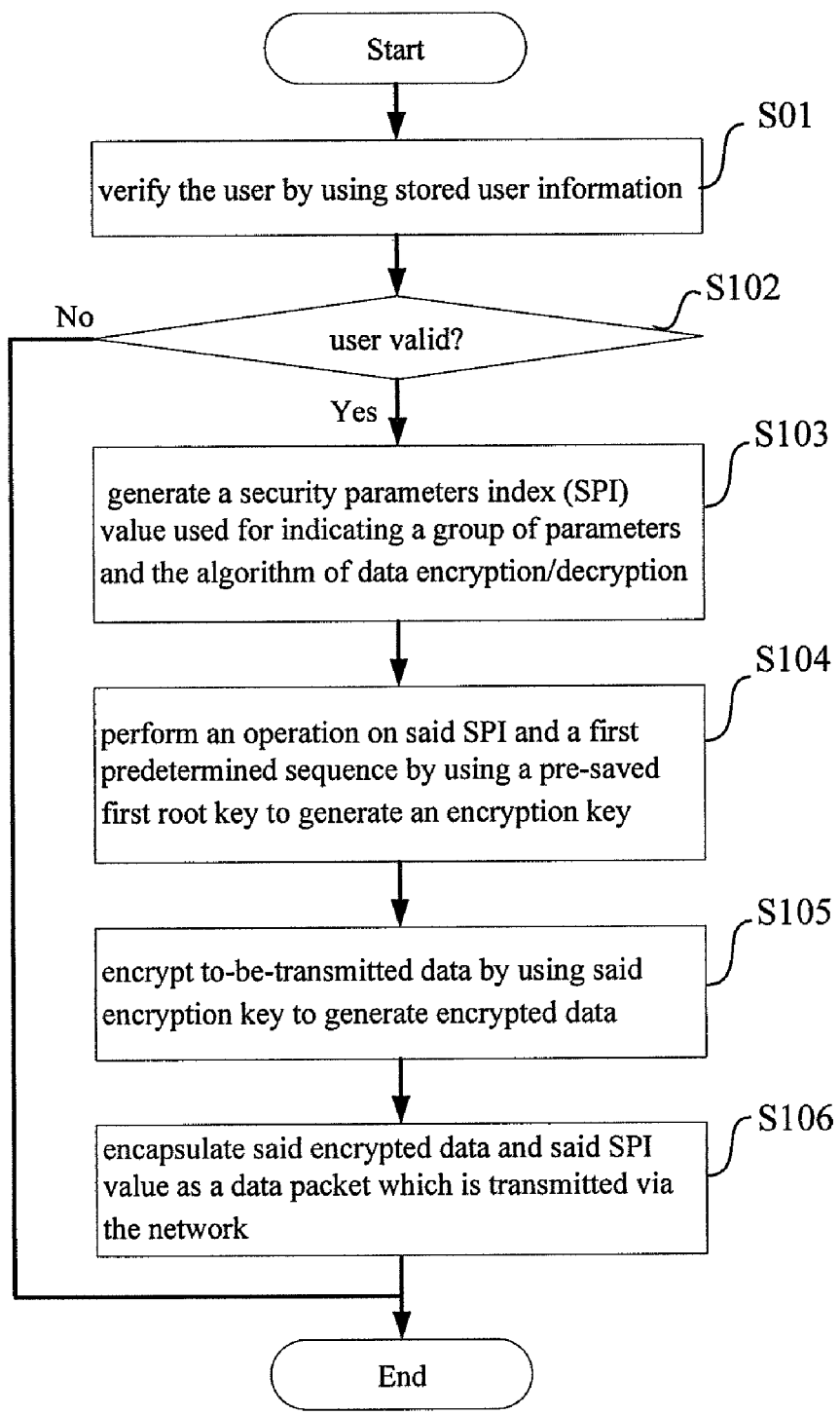
FIG. 2 is a flowchart of a method in the user equipment for implementing special secure communication with a private network which the user equipment belongs to in a communication network according to an embodiment of the present invention.

FIG. 2 is a flowchart of a method in the user equipment for implementing special secure communication with a private network which the user equipment belongs to in a communication network according to an embodiment of the present invention.

Hereinafter, this embodiment will be described in detail with reference to FIG. 2 in conjunction with FIG. 1.

In this embodiment, in order to confirm whether a user has the right to initiate secure communication with a private network (namely, whether he is a valid member), the user needs to be verified prior to the implementation of special secure communication with the belonging private network in user equipment 1. Therefore, in step S101, the identity of the user desiring to initiate secure communication with the private network is verified by using locally pre-stored user-related information and through interaction with the user (for example, hints the user to input user name and password). With the continuous perfection of related technology, the authentication of user identity can be implemented through fingerprint identification, RFID scan and the like. In step S102, a decision is made as to the validity of the user. If the user is valid, the flow goes to step S103, otherwise, the flow will not perform subsequent operation.

In step S103, when the user desires to initiate secure communication with his belonging private network (i.e. the fact that the destination address matches the IP address which is pre-stored at the user equipment end and is possessed by the private network which the user belongs to indicates that the communication belongs to the secure communication with the private network), operations will be performed on the current date, the destination IP address prefix and the source IP address (IP address of the current user equipment) by using the second root key Kspi for generating security parameters index (SPI) and according to the pre-stored private network address prefix (for example, a 64-bit prefix is the first 64 bits of an IP address), to generate a security parameters index (SPI) value. The SPI value, which is used for indicating the encryption/decryption algorithm and parameters for encrypting/decrypting data), may comprise three parts: the first part is used to indicate the adopted security policy scheme which includes encryption algorithm, encapsulation manner etc.; the second part includes a current local date value; and the third part includes the values obtained by performing Hash operations on said current local date value, the destination address prefix, the source address, said second root key etc.

In an embodiment, for example, in IPv6 protocol, the SPI value is 32 bit, among which:

the first part may be 3 bits and used to indicate the adopted security policy scheme. For example, "111" may be used to designate a security scheme with ESP encapsulation, 3DES encryption and MD5 authentication, while "100" is used to designate a security scheme with ESP encapsulation, AES-128 encryption and SHA-1 authentication. Since there are not more than 8 kinds of common security policy scheme currently, 3-bit combinations can completely meet the demands. If there are more common security policy schemes in the future, then more bits among the 32 bits can be allocated to the first part of said SPI value. In this manner, user equipment 1 can notify the IPsec peer end (access device 2) of the concretely used encryption/decryption algorithm by using this part, hence the both parties are able to know from the first part of the SPI value the encryption/decryption algorithm used in this communication (of course, if an encryption/decryption algorithm was pre-agreed between user equipment 1 and access device 2, the other party does not need to be notified through said first part).

The second part may comprise 5 bits. Due to the complexity of the network environment, keys used for encryption and authentication need to be updated regularly to ensure the communication security, monthly dates from 1st to 31st can be covered by using 5-bit binaries and used for generating daily-updated encryption and authentication keys in subsequent steps. If there is no need to regularly update the encryption and authentication keys, this part may not be included, but a predetermined sequence pre-agreed between user equipment 1 and access device 2 instead.

The third part may comprise 24 bits. An agreed MD5 algorithm is performed on the current system's date value, destination address prefix (e.g. the first 64 bits of the IP address of a private network which the internal member belongs to) and source IP address (e.g. the 128-bit IP address at the user equipment end) by using the pre-stored second root key (Kspi) to obtain a 128-bit Hash operation result, the first 24 bits of which are used as the third part of the SPI value.

As a result, a complete SPI value is generated to indicate a group of parameters and the algorithm for data encryption and decryption. Since the inputs include daily-updated date values, the generated SPI value is updated daily.

In step S104, an MD5 operation is performed on the generated SPI value and a predetermined sequence (e.g. destination address prefix namely the first 64 bits of the destination address) known to the both parties by using the locally (e.g. in portable computer or USB storage device) pre-stored first root key (Kroot) to generate an encryption key. Since said SPI value is updated daily, the generated encryption key is also updated daily.

In step S105, data to be sent belonging to secure communication between said user and his belonging private network is encrypted under the agreed encryption algorithm and by using said encryption key to obtain the encrypted data.

In step S106, based on the encapsulation mechanism (e.g. IPsec encapsulation mechanism) which the SPI specifies, the SPI value and the encrypted data which were generated in the previous steps are encapsulated into a data packet to be sent via the network.

Preferably, the method further comprises a step of applying the pre-stored first root key (Kroot) to the previously generated SPI value and a predetermined sequence (e.g. the first 64 bits of the source address) known to the both parties to perform an MD5 operation in order to generate an authentication key. In step S105, after the encrypted data is generated, a Hash operation is performed on the encrypted data by using the generated authentication key Ka, and the first part of the Hash operation result is used as an authentication part. Hereafter, in step S106, the authentication part is encapsulated together with the SPI value and the encrypted data to obtain a data packet to be transmitted.

Preferably, user equipment 1 updates some parameters associated with the special secure communication according to the present invention by accessing a security policy server provided by a carrier, for example, updates the destination address prefix representing the belonging private network, updates some security policy parameters (e.g. the first root key, the second root key, and an encryption/decryption and the authentication algorithm).

At the user equipment end, in order to discriminate between special secure communication with the belonging private network and communication with other external networks, a decision as to whether or not the destination IP address prefix of a data packet to be transmitted matches the IP address of a private network which the user belongs to is made prior to the above operations. If not, it means that the to-be-implemented communication is not secure communication between the user and the belonging private network, and the above processing according to the present invention will not be performed on said data packet which, instead, said data packet is sent out directly.

Figure 3:
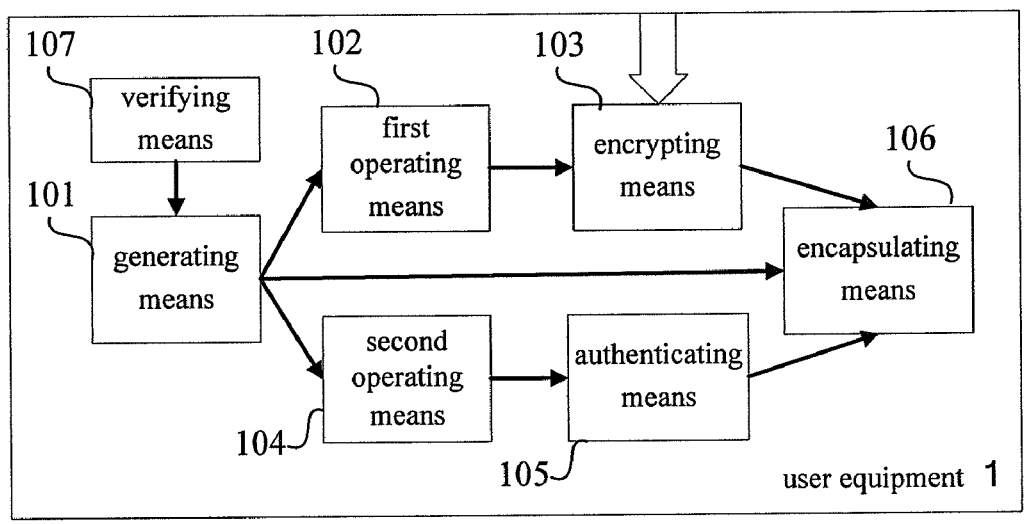
FIG. 3 is a block diagram of user equipment for implementing special secure communication with a private network which the user equipment belongs to in a communication network according to an embodiment of the present invention.

FIG. 3 is a block diagram of user equipment for implementing special secure communication with a private network which the user equipment belongs to in a communication network according to an embodiment of the present invention. As depicted in FIG. 1, user equipment 1 works in an external network and performs secure access to a private network as its member according to the present invention via access device 2. Wherein, as depicted in FIG. 3, said user equipment comprises: generating means 101 for generating a security parameters index (SPI) value, first operating means 102 for generating an encryption key, encrypting means 103 for generating encrypted data, second operating means 104 for generating an authentication key, an authenticating means 103 for generating an authentication part, encapsulating means 106 for encapsulating a data packet, and verifying means 107 for verifying the identity of a user.

In the present embodiment, in order to confirm whether the user has the right to initiate secure communication with a private network (namely, whether he is a valid member), the user needs to be verified prior to the implementation of special secure communication with the belonging private network. Therefore, verifying means 107 verifies the identity of the user desiring to initiate secure communication with the private network by using locally pre-stored user-related information and through interaction with the user (for example, hinting the user to input user name and password). With the continuous perfection of related technology, the verification of user identity can be implemented through fingerprint identification, RFID scan and the like. If the user is valid, related processing is allowed to be performed on the data packet. Otherwise, the operation is rejected.

When verifying means 107 verifies the user to be valid, generating means 101 performs operations on the current date, the destination IP address prefix, the source IP address and the IP address of the current user equipment (host) according to the pre-stored private network address prefix (for example, a b4-bit prefix is the first 64 bits of an IP address) and the second root key Kspi for generating security parameters index (SPI), to generate a security parameters index (SPI) value. The SPI value, which is used for indicating the encryption/decryption algorithm and parameters for encrypting/decrypting data, may comprise three parts: the first part is used to indicate the adopted security policy scheme which includes encryption algorithm, encapsulation manner etc.; the second part includes a current local date value; and the third part includes values obtained through performing Hash operations on said current local date value, the destination address prefix, the source address, said second root key etc.

In an embodiment, for example, in IPv6 protocol, the SPI value has 32 bits, among which:

the first part may be 3 bits and used to indicate the adopted security policy scheme. For example, "111" may be used to designate a security scheme with ESP encapsulation, 3DES encryption and MD5 authentication, and "100" is used to designate a security scheme with ESP encapsulation, AES-128 encryption and SHA-1 authentication. Since there are not more than 8 kinds of common security policy scheme currently, 3-bit combinations can completely meet the current demands. If there are more common security policy schemes in the future, then more bits among the 32 bits can be allocated to the first part of said SPI value. In this manner, user equipment 1 can notify the IPsec peer end (access device 2) of the concretely used encryption/decryption algorithm by using this part, hence, the both parties are able to know from the first part of the SPI value the encryption/decryption algorithm used in this communication (of course, if an encryption/decryption algorithm was pre-agreed between user equipment 1 and access device 2, the other party does not need to be notified through said first part);

The second part may comprise 5 bits. Due to the complexity of the network environment, keys used for encryption and authentication need to be updated regularly to ensure the communication security, monthly dates from 1st to 31st may be covered by using 5-bit binaries and used for generating daily-updated encryption and authentication keys in subsequent steps. If there is no need to regularly update encryption and authentication keys, this part may not be included but a predetermined sequence pre-agreed between user equipment 1 and access device 2 instead.

The third part may comprise 24 bits. An agreed MD5 algorithm is performed on the current system's date value, destination address prefix (e.g. the first 64 bits of the IP address of an private network which the internal member belongs to) and source IP address (e.g. the 128-bit IP address at the user equipment end) by using the pre-stored second root key (Kspi) to obtain a 128-bit Hash operation result, and whose first 24 bits are used as the third part of the SPI value.

As a result, a complete SPI value is generated to indicate a group of parameters and an algorithm of encrypting/decrypting data. Since the inputs include daily-updated date values, the generated SPI value is updated daily.

First operating means 102 performs an agreed MD5 operation on the generated SPI value and a predetermined sequence (e.g. destination address prefix, the first 64 bits of the destination address) known to the both parties by using the locally (e.g. portable computer or USB storage device) pre-stored first root key (Kroot), to generate an encryption key. Since said SPI value is updated daily, the generated encryption key is also updated daily.

Encrypting means 103 is for encrypting data to be sent belonging to the secure communication between said user and his belonging private network under the agreed encryption algorithm by using the encryption key from said first operating means 102, and forwards the encrypted data to encapsulating means 106.

Second operating means 104 performs an MD5 operation on the SPI value from the generating means 101 and another predetermined sequence (e.g. the first 64 bits of the destination address) known to the both parties by using the pre-stored first root key (Kroot) to generate an authentication key, and forwards the authentication key to authenticating means 105. Since said SPI value serves as one of the inputs, said authentication key is updated daily.

Authenticating means 105 performs a Hash operation on the encrypted data by using an authentication key Ka from said second operating means 104, and the first part of the Hash operation result is used as an authentication part to determine whether the sender is reliable.

Encapsulating means 106 is used for encapsulating the SPI value from generating means 101, the encrypted data from the encrypting means 103 and the authentication part from the authenticating means 105 into a to-be-transmitted data packet.

Preferably, user equipment 1 updates some parameters associated with the special secure communication according to the present invention by accessing a security policy server provided by a carrier, for example, updates the destination address prefix representing his belonging private network, updates some security policy parameters (e.g. the first root key, the second root key, and the encryption/decryption and authentication algorithm).

At the user equipment 1 end, in order to discriminate between special secure communication with the belonging private network and communication with other external network, a decision as to whether or not the destination IP address prefix of a to-be-transmitted data packet matches the IP address of a private network which the user belongs to is made prior to the above operations. If not, it means that the to-be-implemented communication is not secure communication between the user and his belonging private network, and the above processing according to the present invention will not be performed on said data packet which, instead, will be sent out directly.

FIGS. 4 and 5 are flowcharts of the method in an access device for supporting special secure communication between user equipment and the private network which the user equipment belongs to in a communication network according to an embodiment of the present invention.

As depicted in FIG. 1, access device 2 is for connecting to multiple private networks and is responsible for controlling two-way communication between a private network and the network outside. For security needs of a private network, all communication associated with a private network can be classified into: 1) special secure communication according to the present invention initiated by user equipment which is located in an external network and is a valid member; 2) other normal communication (e.g. data packets which do not use an IPsec encryption scheme and communication which uses an IPsec encryption scheme of the prior art) initiated by said user equipment to other external network; and 3) other normal communication (e.g. data packets which do not use an IPsec encryption scheme and communication using an IPsec encryption scheme of the prior art) initiated by a private network. All malicious traffics from external networks will be discarded at access device 2, so that the security of the private network is ensured. Preferably, suppose the access device has recorded all related information of the above three kinds of set up communication, this can be implemented by using, for example, common firewall technology. For special secure communication according to the present invention initiated by user equipment which is located in an external network and is a valid member, the access device needs to record and update such communication's destination IP address, source IP address, the SPI value, encryption key, authentication key and TCP/UDP port number used in this communication. For other normal communication of a private network or user equipment, the access device may record and update the corresponding destination IP address, source IP address, TCP/UDP port number etc.

Further, the access device needs to record IP address prefixes of all private networks under its management, first root keys and second root keys corresponding to respective prefixes. That is, a different private network has a different IP address prefix. The access device maps said different prefixes respectively to the first root key used for generating encryption and authentication keys and to the second root key used for generating a SPI value of each private network. Said two root keys have highest security, and the SPI value, the encryption key and the authentication key used for secure communication are generated by said first and second root keys under an agreed algorithm and are then used for data encryption/decryption and authentication under the agreed encryption and authentication algorithm. Preferably, like the user equipment, access device 2 may update some parameters associated with the special secure communication according to the present invention by accessing a security policy server provided by a carrier, for example, updates the destination address prefix representing the belonging private network, updates some security policy parameters (e.g. the first root key, the second root key, and the encryption/decryption and authentication algorithm).

FIG. 4 is a processing flow in the method when access device 2 receives a data packet from user equipment. This part of said method will be described with reference to FIG. 4.

In step S201, the access device receives a data packet from user equipment located in an external network.

In step S202, a decision is made as to whether or not said data packet from user equipment is an encrypted data packet used for special secure communication with said private network.

If said data packet from user equipment belongs to special secure communication with its belonging private network, which is initiated by user equipment 1, according to the present invention, the flow goes to step S203. In this step, a decryption algorithm corresponding to the encryption algorithm performed at the user equipment is performed on the encrypted data part of said data packet from the user equipment by using the first root key corresponding to said private network, to generate an ordinary data packet, and an ordinary data packet which is then forwarded to said private network.

If said data packet from user equipment falls into the user equipment's another type of communication that has been set up, the flow goes to step S204 in which said data packet is forwarded directly.

If said data packet from user equipment does not fall into the user equipment's another type of communication that has been set up, the flow goes to step S205 in which said data packet is discarded.

According to a preferred embodiment of the present invention, in step S202, a decision is made on said data packet through the following steps:

As described above, the data packet received at access device 2 might have three types. Based on all recorded information related to communication already set up, access device 2 may compare information of the received data packet with the recorded information.

If said data packet is determined, through the comparison, to belong to communication already set up, the flow goes to steps S203 to S205 based on a concrete type of communication which the data packet belongs to, in which the data packet is processed in a corresponding manner.

If said data packet belongs to communication with the belonging private network, and is initiated by a user as a valid member from an external network, since the authentication key and the encryption key used for the communication have been stored, hence, in step S203, said data packet will subject to the authentication relying on said authentication key, and for the data packet passes the authentication successfully, the encrypted data of said data packet is encrypted by using said stored encryption key used for the communication, and the resulting ordinary data packet is then forwarded to the destination private network.

If said data packet belongs to said user equipment's other normal communication (e.g. data packets that do not use an IPsec scheme and data packets that use an IPsec scheme in the prior art) that has been set up, said data packet is directly forwarded via the network in step S204.

If the data packet from user equipment does not match recorded information related to any communication already set up, there might be two possibilities:

(1) said data packet belongs to special secure communication with said private network in accordance with the present invention, which is initiated by user equipment for the first time with no information thereof recorded at the access device end;

(2) said data packet belongs to communication from unknown origin (might be a malicious attack) and should be discarded in order to protect the private network.

For situation (2), the data packet is simply discarded.

For situation (1), said data packet is a data packet using a scheme (preferably, based on IPsec encapsulation) provided by the present invention, and including a SPI value, encrypted data and the authentication part. Therefore, access device 2 should first extract from said data packet the destination address prefix representing the private network and the SPI value. Since in the access device are pre-stored IP address prefixes of all private networks under the management thereof, first root keys and second root keys which correspond to said prefixes and belong to respective private networks, the access device can obtain the first and the second root key used for processing said data packet by searching simply. Based on the first part of said extracted SPI value, which is used for indicating the security policy scheme (e.g. encryption/decryption algorithm and authentication algorithm), the access device can know from all pre-stored security policy schemes the encryption/decryption algorithm, the authentication algorithm and the like used by said data packet, and then the access device can perform further processing on said data packet.

First, according to the second part extracted from the original SPI value and representing the local date value of user equipment 1, a new security parameters index (SPI) value is generated by using a pre-stored second root key corresponding to said destination address prefix and in the same generation manner as at the user equipment. Said original SPI value is then compared with the new SPI value. If they are consistent with each other, the data is determined to be sent from user equipment as a valid member.

In a preferred embodiment of the present invention, a 128-bit Hash value is generated by processing the first 64 bits of the destination address, 128 bits of the source address of said data packet and the second part (date value) of said SPI value using a pre-stored first root key corresponding to said destination address prefix, and the first 24 bits of the 128-bit Hash value are then used as a third part of a new SPI value used for check.

Next, the third part of the SPI value of said data packet is compared with said generated third part of the new SPI value used for check. If the third part of said original SPI value is consistent with the third part of the new SPI value generated at the access device, the data is determined to be sent from user equipment as a valid member, and need further authentication. Otherwise, said data packet is discarded.

The authentication method is performing the same operation as at the user equipment on the generated SPI value and a predetermined sequence pre-agreed with the user equipment by using the first root key corresponding to said destination address prefix, in order to generate a new authentication key, and performing the same authentication operation as at the user equipment on the encrypted data part of the encrypted data packet from said user equipment by using said new authentication key, in order to generate a new authentication part. In a preferred embodiment of the present invention, said predetermined sequence is the source address.

Subsequently, the original authentication part extracted from said data packet is compared with said new authentication part. If they are consistent with each other, the data packet will be deemed as be from a valid member without tampered. Thus, an operation is performed on the destination address prefix (e.g. the first 64 bits of the destination IP address) and said SPI value under the agreed algorithm by using said first root key, in order to generate an encryption key. The encrypted data encapsulated in said data packet is then decrypted by using the generated encryption key, in order to obtain the decrypted data. The decrypted data is encapsulated as an ordinary data packet which is forwarded to the destination private network in step S203.

FIG. 5 shows the flow regarding the processing performed on the data packet from a private network to the outside by the access device according to the method. Hereinafter, this part of said method will be described with reference to FIG. 5.

As described above, since the access device has recorded related information of all set up communication. Upon receipt of a data packet from a private network, access device 2 can compare information of the received data packet with existing information. If said data packet is determined, through the comparison, to belong to other normal communication (e.g. data packets that do not use an IPsec scheme and data packets that use an IPsec scheme according to the prior art) that has been initiated by the private network, said data packet is directly forwarded. If said data packet belongs to the special secure communication according to the present invention with said private network involved, said ordinary data packet is converted into an encrypted data packet used for said special secure communication by using said first root key and said second root key, and the converted encrypted data packet is then sent to said user equipment.

As depicted in FIG. 5, a data packet from a private network is received in step S206.

In step S207, according to recorded related information of all set up communication, a decision is made as to whether the data packet from the private network belongs to ordinary data packets of the special secure communication according to the present invention, which has been set up with said user equipment, or belongs to the private network's other types of communication already set up (e.g. data packets that do not use an IPsec encryption scheme and communication that uses an IPsec encryption scheme in the prior art).

If the data packet belongs to the special secure communication set up between said private network and said user equipment, then in step S208, said ordinary data packet is converted into an encrypted data packet used for said special secure communication by using said first root key and said second root key and in the same manner as at the user equipment, and the converted encrypted data packet is then sent to said user equipment.

If the data packet belongs to communication of other type which involves said private network, said data packet will be forwarded directly in step S209.

If the data packet does not belong to any recorded set up communication (does not conform to any recorded information), said data packet is forwarded directly in step S210.

For the data packet that does not conform to any of recorded information, the data packet might belong to the following situations after simple judgment being performed by the access device 2.

said data packet uses an IPsec encapsulation: in this situation, no matter there is related information of said communication saved at the access device 2 or not, access device 2 can deem that said data packet is based on an IPsec scheme in the prior art and is a data packet that should be forwarded normally, because only the private network needs to be protected and an external user is prevented from accessing the private network at will. However, the access to an external network by the private network is not restricted here. Thus, the data packet is sent to an external network after the related information of the communication is recorded (performed where there is no related record);

said data packet does not use an IPsec encapsulation: this might include the following situations:

(a) if no information matching the related information of said data packet is saved at the access device, then it is deemed that said data packet belongs to other communication initiated by the private network and should be forwarded normally. Thus, said data packet is then directly sent to the destination address outside the private network;

(b) if information matching the related information of said data packet is saved at the access device, then, according to the related information of set up communication saved at recording means, access device 2 makes a decision as to whether said data packet belongs to normal communication (does not use an Ipsec scheme) initiated by the private network with an external network or the special secure communication according to the present invention between the private network and the user equipment as a member of the private network. For these two situations, the access device 2 performs the following operations respectively:

(i) communication (does not use an IPsec scheme) initiated by the private network with an external network, data packet of such kind will be sent to the destination address directly; said data packet may belong to:

(ii) the special secure communication according to the present invention initiated from an external network with the private network. For data packet of this kind, the first and second root keys used by the data packet are found in the stored recorded information related to the communication in step S207, and, according to said root keys, the second root key is applied to the destination IP address, the source IP address and the date value of the current system (access device) to generate a SPI value under the agreed algorithm (denoted by the first part of the SPI value generated herein), and the SPI value is used to generate encryption and authentication keys under the exertion of the first root key. Next, to-be-sent data is encrypted by using said encryption key to generate encrypted data, and said authentication key is applied to said data packet to generate an authentication part, and said SPI value, said encrypted data and said authentication part are encapsulated into an IPsec data packet which will be sent to the destination IP address (the user equipment in an external network) in subsequent steps.

FIG. 6 is a block diagram of an access device for supporting special secure communication between user equipment and a private network which the user equipment belongs to in a communication network according to an embodiment of the present invention. Wherein, access device 2 comprises: a first receiving means 201 for receiving a data packet from said user equipment; a first sending means 204 for sending data packets; a recording means 205 for recording related information of all set up communication; a second receiving means 206 for receiving a data packet from said private network; a second sending means 207 for sending data packets from said private network; a deciding means 202 for making a decision as to whether said data packet from the user equipment or the private network is an encrypted data packet of secure communication between the user equipment and the private network according to the present invention; and a conversion processing means 203 for processing the data packet according to a decision result and providing the data packet processed to the first sending means 204 or the second sending means 207.

In an embodiment according to the present invention, the deciding means 202 further comprises: an extracting means 2021, an operating means 2022, a comparing means 2023 and a determining means 2024. Upon receipt of the data packet from the user equipment, a decision can be made on the data packet through the following operation.

As described above, the data packet received at access device 2 might have three types. Since recording means 205 has recorded the related information of all set up communication, deciding means 202 may perform the following operation:

comparing related information of the received data packet with the related information of all set up communication in recording means 205;

determining whether the data packet belongs to the special secure communication with the belonging private network initiated by the user as a valid member from an external network or other set up normal communication of the user equipment (e.g. data packets that do not use an IPsec scheme and data packets that use an IPsec scheme in the prior art), and notifying conversion processing means 203 of the determination result.

Conversion processing means 203 is used to perform the following operation:

if said data packet belongs to communication with the belonging private network initiated by the user as a valid member from an external network, since the authentication key and the encryption key used by the communication have been stored, hence, said data packet will subject to the authentication relying on said authentication key, and for the data packet passed the authentication successfully, the encrypted data of said data packet will be encrypted by using said stored encryption key used for the communication, and the decrypted ordinary data packet is then forwarded to the destination private network.

If said data packet belongs to other normal communication (e.g. data packets that do not use an IPsec scheme and data packets that use an IPsec scheme in the prior art) that has been set up of said user equipment, said data packet will be forwarded via the network directly.

If the data packet from user equipment does not match any recorded information related to the set up communication, there might be two possibilities:

(1) said data packet belongs to special secure communication with said private network, which is initiated by user equipment for the first time, according to the present invention and no information thereof recorded at the access device end;

(2) said data packet belongs to communication of unknown origin (might be a malicious attack) and should be discarded in order to protect the private network.

Therefore, when the data packet from the user equipment does not match the recorded related information of set up communication, deciding means 202 needs to make a further decision on the data packet.

Specifically, deciding means 202 further comprises: extracting means 2021, operating means 2022, comparing means 2023 and determining means 2024.

For situation (1), said data packet is a data packet using a scheme (preferably, based on IPsec encapsulation) provided by the present invention, including a SPI value, encrypted data and an authentication part. Therefore, extracting means 2021 should extract from said data packet a destination address prefix representing the private network and a SPI value. Since in access device 2 are pre-stored IP address prefixes of all private networks under the management thereof, first root keys and second root keys which correspond to said prefixes and belong to respective private networks, the access device can obtain first and second root keys used for processing said data packet by simple searching.

Based on the first part of said extracted SPI value, used for indicating a security policy scheme (e.g. encryption/decryption algorithm and authentication algorithm), operating means 2022 can know from all pre-stored security policy schemes the encryption/decryption algorithm, the authentication algorithm and the like used by said data packet, and operating means 2022 can perform the following operation on the data packet: according to a second part extracted from the original SPI value and representing the local date value of user equipment 1, a new security parameters index (SPI) value is generated by using the pre-stored second root key corresponding to said destination address prefix and in the same generation manner as at the user equipment.

Comparing means 2023 compares said original SPI value with the new SPI value.

Determining means 2024 will determine according to the result derived from comparing the original SPI value with the new SPI value generated on the basis of the second part extracted from the original SPI value by using the pre-stored second root key corresponding to said destination address prefix and in the same manner as at the user equipment. If they are consistent with each other, determining means 2024 deems that the data was sent from user equipment which is a valid member.

In a preferred embodiment of the present invention, operating means 2022 generates a 128-bit Hash value by performing operation on the first 64 bits of the destination address, 128 bits of the source address of said data packet and the second part (date value) of said SPI value and by using a pre-stored first root key corresponding to said destination address prefix, then, the first 24 bits of the 128-bit Hash value will be used as a third part of a new SPI value used for check.

Next, comparing means 2023 compares the third part of the SPI value of said data packet with said generated third part of the new SPI value used for check. If the third part of said original SPI value is consistent with the generated third part of the SPI value at the access device, determining means 2024 determines that the data was sent from the user equipment which is a valid member, and then said data packet will subject to the authentication. Otherwise, determining means 2024 discards said data packet.

The concrete operation for authentication is as follows:

operating means 2022 performs the same operation as at the user equipment on the operated SPI value and a predetermined sequence pre-agreed with the user equipment by using the first root key corresponding to said destination address prefix, in order to generate a new authentication key, and performs the same authentication operation as at the user equipment on the encrypted data part of an encrypted data packet from said user equipment by using said new authentication key, in order to generate a new authentication part. In a preferred embodiment of the present invention, said predetermined sequence is a source address.

Subsequently, comparing means 2023 compares the original authentication part extracted from said data packet with said new authentication part. If they are consistent with each other, determining means 2024 determines that the data packet has not been tampered and was sent from a valid member. Thus, conversion processing means 203 performs an operation on the destination address prefix (e.g. the first 64 bits of the destination IP address) and said SPI value under the agreed algorithm by using said first root key, in order to generate an encryption key. The encrypted data encapsulated in said data packet is then decrypted by using the generated encryption key, in order to obtain decrypted data. The decrypted data is encapsulated as an ordinary data packet. Said ordinary data packet is then provided to first sending means 204 so as to be sent to the destination private network.

In an embodiment of the present invention, after second receiving means 205 receives a data packet from the user equipment, deciding means 202 makes a decision on the data packet through the following operation:

As described above, since recording means 205 has recorded related information of all set up communication. Upon receipt of a data packet from a private network by access device 2, deciding means 202 can compare information of the received data packet with existing information in recording means 205. A number of determination results will result from the comparison. If said data packet is determined to belong to other normal communication (e.g. data packets that do not use an IPsec scheme and data packets that use an IPsec scheme in the prior art) that has been initiated by the private network, conversion processing means 203 directly provides said data packet to second sending means 206 which will forward the data packet. If said data packet belongs to the special secure communication with said private network according to the present invention, conversion processing means 203 converts said ordinary data packet into an encrypted data packet used for said special secure communication by using said first root key and said second root key, and sends the converted encrypted data packet to said user equipment.

For the data packet that does not conform to any of recorded information, access device 2 determines the data packet might belong to the following situations:

said data packet uses an IPsec encapsulation: in this situation, whether or not there is related information of said communication saved at the recording device 205, the deciding means 203 can determine said data packet is based on an IPsec scheme in the prior art and is a data packet that should be forwarded normally, because the access device needs to protect the private network only and prevent an external user from accessing the private network at will. However, the access device does not restrict the access to an external network by the private network. Thus, after related information is recorded at the recording means 205 (need to be performed where there is no related record), the data packet is sent to an external network;

said data packet does not use an IPsec encapsulation, this might include the following situations:

(a) if no information matching the related information of said data packet is saved at the access device, then said data packet is determined to belong to other communication initiated by the private network, and should be forwarded normally. Thus, said data packet is provided to the second sending means 207 for sending;

(b) if information matching the related information of said data packet is saved at the access device, then according to the related information of set up communication as saved at recording means, said data packet is determined to belong to normal communication (does not use an Ipsec scheme) initiated by the private network with an external network or the special secure communication according to the present invention between the private network and the user equipment located in an external network. For these two situations, said conversion processing means 203 performs the following operations respectively:

(i) communication (does not use an IPsec scheme) initiated by the private network with an external network Conversion processing means 203 provides the second sending means 207 with said data packet so that said data packet can be sent heading the destination address;

(ii) the special secure communication according to the present invention initiated by an external network with the private network.

For data packets of this kind, conversion processing means 203 searches the used first and second root keys in the recorded information related to the communication as saved in the recording means, applies the second root key to the destination IP address, the source IP address and the date value of the current system (access device) to generate a SPI value under the agreed algorithm (denoted by the first part of the generated SPI value) and according to said root keys, and generates encryption and authentication keys by using the SPI value under the exertion of the first root key. Next, conversion processing means 203 encrypts to-be-sent data by using said encryption key to generate encrypted data, generates an authentication part by applying said authentication key to said data packet, encapsulates said SPI value, said encrypted data and said authentication part into an encrypted data packet (e.g. an IPsec data packet) and then provides the encrypted data packet to the second sending means 207, so that the encrypted data packet can be sent to the destination IP address (the user equipment in an external network).

As the embodiments of the present invention have been described with reference to the accompanying drawings, it is to be understood that the present invention is not limited to the embodiments. Various modifications or alternations may be made by those skilled in the art within the scope as defined in the appended claims.

What is claimed is:

1. A method for implementing special secure communication with a private network in user equipment of a communication network, comprising the steps of:
    a) generating a security parameters index value by using a pre-stored second root key, wherein said security parameters index value indicates an encryption/decryption algorithm and parameters of data encryption/decryption, and wherein said security parameters index value comprises a Hash operation on a locally current date value, a destination address prefix, a source address, and said second root key;
    b) performing an operation on said security parameters index value and a first predetermined sequence by using a pre-stored first root key to generate an encryption key;
    c) encrypting data to be transmitted by using said encryption key to generate encrypted data; and
    d) encapsulating said encrypted data and said security parameters index value into a data packet which is transmitted via said communication network.

2. The method according to claim 1, wherein said security parameters index value comprises three parts, comprising:
    a first part used to indicate the adopted security policy scheme comprising said encryption algorithm, said encapsulation manner etc.;
    a second part comprises said locally current date value; and
    a third part comprises a value obtained by performing a Hash operation on said locally current date value, said destination address prefix, said source address, said second root key etc.

3. The method according to claim 1, further comprising the steps of:
performing an operation on said security parameters index value and a second predetermined sequence by using said first root key to generate an authentication key;
performing said Hash operation on said encrypted data by using said authentication key to generate an authentication part;
wherein step d) further comprises the step of:
encapsulating said authentication part into said encrypted data packet to be transmitted.

4. The method according to claim 1, further comprising, prior to step a), the steps of:
verifying an identity of a user by using locally pre-stored user-related information and through interaction with the user;
if said user is a valid user, going to step a);
otherwise, stopping the operation.

5. The method according to claim 1, wherein said communication network is an IP-based network.

6. User equipment for implementing special secure communication with a belonging private network in a communication network, comprising:
means for generating a security parameters index value by using a pre-stored second root key, wherein said security parameters index value indicates an encryption/decryption algorithm and parameters of data encryption/decryption, wherein said security parameters index value comprises a Hash operation on a locally current date value, a destination address prefix, a source address, and said second root key;
first operating means for performing an operation on said security parameters index value and a first predetermined sequence by using a pre-stored first root key to generate an encryption key;
means for encrypting the data to be sent by using said encryption key to generate encrypted data; and
means for encapsulating said encrypted data and said security parameters index value into a data packet which is transmitted via said communication network.

7. The user equipment according to claim 6, wherein said security parameters index value comprises three parts, comprising:
a first part is used to indicate the adopted security policy scheme comprising the encryption algorithm, the encapsulation manner etc.;
a second part comprises said locally current date value; and
a third part comprises a value obtained by performing a Hash operation on said locally current date value, said destination address prefix, said source address, said second root key etc.

8. The user equipment according to claim 6, further comprising:
second operating means for performing an operation on said security parameters index value and a second predetermined sequence by using said first root key to generate an authentication key; and
means for performing an authentication operation on said encrypted data by using said authentication key to generate an authentication part;
wherein said means for encapsulating encapsulates said authentication part into said data packet to be transmitted.

9. The user equipment according to claim 6, further comprising:
verifying means for performing the following operations:
verifying an identity of a user by using locally pre-stored user-related information and through interaction with the user;
if said user is a valid user, allowing the subsequent operation;
otherwise, stopping the operation.

10. The user equipment according to claim 6, wherein said communication network is an IP-based network.

11. A method for supporting special secure communication between user equipment and the belonging private network in an access device of a communication network, comprising the steps of:
i) receiving a data packet from said user equipment;
ii) deciding whether said data packet from the user equipment belongs to special secure communication between said user equipment and the belonging private network,
wherein step ii) further comprises:
generating a security parameters index value by using a pre-stored second root key; comparing said generated security parameters index value with the security parameters index value in the incoming data packet; and performing an operation on said security parameters index value and a first predetermined sequence by using a pre-stored first root key to generate an encryption key;
iii) if said data packet from the user equipment belongs to said special secure communication, performing a decryption algorithm, which corresponds to an encryption algorithm at the user equipment, on encrypted data part in said data packet from the user equipment by using a pre-stored first root key that corresponds to said private network to generate an ordinary data packet, and forwarding the ordinary data packet to said private network.

12. The method according to claim 11, wherein step ii) further comprises the steps of:
extracting from said data packet from the user equipment a destination address prefix of said data packet and an original security parameters index value;
generating said new security parameters index value by using said second root key that corresponds to said destination address prefix and in the same generating manner as at the user equipment;
comparing said original security parameters index value with the new security parameters index value; and
if said original security parameters index value is consistent with the new security parameters index value, determining said data packet from the user equipment belongs to said special secure communication.

13. The method according to claim 12, wherein step ii) further comprises the steps of:
extracting said original authentication part from said security parameters index value;
performing on the operated security parameters index value the same operation as at the user equipment by using a pre-stored first root key that corresponds to said destination address prefix to generate a new authentication key;
performing on encrypted, data part in said encrypted data packet from the user equipment the same authentication operation as at the user equipment by using said new authentication key to generate a new authentication part;
comparing said original authentication part with said new authentication part; and
if said original authentication part is consistent with said new authentication part, determining said data packet from the user equipment belongs to said special secure communication.

14. The method according to claim 11, further comprising the steps of:
- recording related information of all set up communication;
- based on said related information, deciding whether said data packet from the user equipment belongs to special secure communication between the user equipment and said private network or said user equipment's set up communication which falls into other type;
- if said data packet from the user equipment belongs to said special secure communication, performing a decryption algorithm, which corresponds to an encryption algorithm at the user equipment, on encrypted data part in said data packet from the user equipment by using said first root key to generate an ordinary data packet, and forwarding the ordinary data packet to said private network;
- if said data packet from the user equipment belongs to said user equipment's set up communication which falls into other type, forwarding said data packet directly; and
- if said data packet from the user equipment does not belong to said special secure communication or said user equipment's set up communication which falls into other type, discarding said data packet.

15. The method according to claim 14, further comprising the steps of;
- receiving a data packet from said private equipment;
- based on the recorded related information of all set up communication, deciding whether said data packet from the private equipment belongs to special secure communication between said private equipment and the user equipment or said private network's set up communication which falls into other type;
- if said data packet from the private equipment belongs to the special secure communication set up between said private equipment and the user equipment, converting said ordinary data packet into an encrypted data packet used for said special secure communication by using said first root key and said second root key in the same manner as at the user equipment, and sending the converted encrypted data packet to said user equipment; and
- if said data packet from the private network belongs to said private network's set up communication which falls into other type, forwarding said data packet directly.

16. The method according to claim 11, wherein said related information comprises a destination address, a source address, a security parameters index (SPI) value, and a first root key of a data packet.

17. The method according to claim 11, wherein said communication network is an IP-based network.

18. An access device for supporting special secure communication between user equipment and the belonging private network in a communication network, comprising:
- first means for receiving a data packet from said user equipment;
- deciding means for deciding whether said data packet from the user equipment belongs to special secure communication between said user equipment and the belonging private network, to generate a security parameters index value by using a pre-stored second root key, to compare said generated security parameters index value with the security parameters index value in the incoming data packet; and to perform an operation on said security parameters index value and a first predetermined sequence by using a pre-stored first root key, to generate an encryption key;
- conversion processing means for, if said data packet belongs to said special secure communication, performing a decryption algorithm, which corresponds to the encryption algorithm at the user equipment, on encrypted data part in said data packet from the user equipment by using a pre-stored first root key that corresponds to said private network, to generate an ordinary data packet; and
- first sending means for forwarding the data packet.

19. The access device according to claim 18, wherein said deciding means comprises:
- means for extracting from said data packet a destination address prefix of said data packet and an original security parameters index value;
- operating means for generating a new security parameters index value by using a second root key that corresponds to said destination address prefix and in the same generating manner as at the user equipment;
- means for comparing said original security parameters index value with the new security parameters index value; and
- determining means for, if said original security parameters index value is consistent with the new security parameters index value, determining said data packet from the user equipment belongs to said special secure communication.

20. The access device according to claim 19, wherein
- said means for extracting is operable to extract an original authentication part from said security parameters index value;
- said operating means is operable to perform on the operated security parameters index value the same operation as at the user equipment by using a pre-stored first root key that corresponds to said destination address prefix to generate a new authentication key;
- said means for comparing is operable to compare said original authentication part with said new authentication part; and
- said determining means is further used for, If said authentication part is consistent with said new authentication part, determining said data packet from the user equipment belongs to said special secure communication.

21. The access device according to claim 18, further comprising:
- means for recording related information of all set up communication;
- wherein, said deciding means is further used for, based on said related information, deciding whether said data packet from the user equipment belongs to special secure communication between the user equipment and said private network or said user equipment's set up communication which falls into other type;
- said conversion processing means is operable to perform the following functions:
- if said data packet is an encrypted data packet used for secure communication between the user equipment and said private network, converting said encrypted data packet into an ordinary data packet by using a pre-stored first root key that corresponds to said private network, and providing the ordinary data packet to the first sending means;
- if said data packet belongs to said user equipment's set up communication which falls into other type, directly providing said data packet to said first sending means;
- otherwise, discarding said data packet.

22. The access device according to claim 21, further comprising:
- second means for receiving a data packet from said private network;

second sending means for sending the data packet to the user equipment;

wherein, said deciding means is further used for, based on the recorded related information of all set up communication, deciding whether said data packet from the private network belongs to special secure communication set up between said private network and the user equipment or said private network's set up communication which falls into other type;

said conversion processing means is operable to perform the following operations:

if said data packet from the private network belongs to the special secure communication set up between said private network and the user equipment, converting said ordinary data packet into an encrypted data packet used for said special secure communication by using said first root key and said second root key and in the same manner as at the user equipment, and providing the converted ordinary data packet to the second sending means;

if said data packet from the private network belongs to said private network's set up communication which falls into other type, directly providing said data packet to the second sending means.

23. The access device according to claim 18, wherein said related information comprises a destination address, a source address, a security parameters index (SPI) value, a first root key of a data packet.

24. The access device according to claim 18, wherein said communication network is an IP-based network.

25. The method according to claim 1, wherein said communications network is an IPv6-based network.

* * * * *